United States Patent [19]
Henry et al.

[11] Patent Number: 5,977,677
[45] Date of Patent: Nov. 2, 1999

[54] COMBINATION BEARING FOR GAS TURBINE ENGINE

[75] Inventors: Mark S. Henry, Indianapolis, Ind.; Victor Iannello, Roanoke, Va.; Eugene E. Pfaffenberger, Indianapolis; Donald W. Burns, Danville, both of Ind.

[73] Assignee: Allison Engine Company, Indianapolis, Ind.

[21] Appl. No.: 09/040,253

[22] Filed: Mar. 10, 1998

Related U.S. Application Data

[63] Continuation of application No. 08/670,285, Jun. 26, 1996, abandoned.

[51] Int. Cl.[6] .................................................. H02K 7/09
[52] U.S. Cl. .......................... 310/90.5; 310/90; 384/102
[58] Field of Search ..................... 310/90.5, 90; 384/102

[56] References Cited

U.S. PATENT DOCUMENTS

| | | | |
|---|---|---|---|
| 3,749,528 | 7/1973 | Rousseau et al. .................... 417/424 |
| 4,629,261 | 12/1986 | Eiermann et al. .................... 310/90.5 |
| 4,641,978 | 2/1987 | Kapich .................................. 384/102 |
| 4,652,780 | 3/1987 | Murakami et al. ................... 310/90.5 |
| 5,021,697 | 6/1991 | Kralick ................................. 310/90.5 |
| 5,083,053 | 1/1992 | New ..................................... 310/90.5 |
| 5,104,284 | 4/1992 | Hustak, Jr. et al. ................. 415/105 |
| 5,126,612 | 6/1992 | Girault ................................. 310/90.5 |
| 5,142,177 | 8/1992 | Higuchi et al. ...................... 310/90.5 |
| 5,285,123 | 2/1994 | Kataoka et al. ......................... 310/88 |
| 5,355,040 | 10/1994 | New .................................... 310/90.5 |
| 5,386,166 | 1/1995 | Reimer et al. ....................... 310/90.5 |
| 5,462,470 | 10/1995 | Oda et al. .............................. 451/294 |
| 5,521,448 | 5/1996 | Tecza et al. ......................... 310/90.5 |
| 5,588,754 | 12/1996 | Miller ..................................... 384/609 |
| 5,658,125 | 8/1997 | Burns et al. ............................. 415/1 |
| 5,735,666 | 4/1998 | Johnston ................................. 415/34 |
| 5,749,700 | 5/1998 | Henry et al. ............................ 415/104 |

FOREIGN PATENT DOCUMENTS

| | | | |
|---|---|---|---|
| 58-65321 | 4/1983 | Japan .................................. 310/90.5 |
| 59-194125 | 11/1984 | Japan .................................. 310/90.5 |
| 2-280646 | 11/1990 | Japan .................................. 310/90.5 |

*Primary Examiner*—Nestor Ramirez
*Assistant Examiner*—Karl Tamai
*Attorney, Agent, or Firm*—Woodard, Emhardt, Naughton, Moriarty & McNett

[57] ABSTRACT

The present invention contemplates a combination bearing for supporting a rotating rotor within a gas turbine engine. The combination bearing including a magnetic bearing system and dry solid lubricated rolling element auxiliary bearings units for sharing the shaft load. The rotating central shaft being normally supported by the active electromagnetic bearing system. The auxiliary bearing unit being soft mounted to the shaft and engine housing and rotatable with the shaft. Soft mounting of the bearings between the housing and the shaft allows a substantially stable transition from the all magnetic bearing support to a physically contacting mechanically assisted support of the shaft.

29 Claims, 7 Drawing Sheets

COMBINATION BEARING FOR GAS TURBINE ENGINE

Continuation of prior application Ser. No. 08/670,285 Jun. 26, 1996 now abandoned.

BACKGROUND OF THE INVENTION

The present invention relates generally to the design and construction of a combination bearing system for supporting a rotor shaft within a gas turbine engine. More particularly, in one embodiment of the present invention an auxiliary bearing is coupled with an active magnetic bearing to support a rotatable shaft within the gas turbine engine. Although, the present invention was developed for use in a gas turbine engine, certain applications may be outside of this field.

It is well known that a gas turbine engine must have a compressor component that develops some or all of the pressure rise specified by the system cycle. The compressor is driven by a rotating shaft connected to a turbine. Turbines are well known for converting thermal energy from a high temperature gaseous flow stream into mechanical energy. While compressors and turbines are very distinct high speed rotating machines they both utilize rows of vanes and blades to influence the fluid flow. The blade and vane rows often operate in an unsteady flow, where both the velocity magnitude and direction fluctuate. Further, individual blades may be subjected to lift and drag forces, they stall, they generate boundary layers, wakes, and under some circumstances shock waves. These high speed rotating blades are coupled to a shaft that is supported within a mechanical housing by a bearing system. The bearing system must be able to withstand significant dynamic and static loads within a hostile environment.

As engine designers continue to increase the efficiency and power output from gas turbine engines the application of magnetic bearings for supporting and controlling the rotor becomes desirable. The integration of magnetic bearings into the engine would allow the rotor shaft to be supported by magnetic forces, eliminate frictional forces, along with mechanical wear and the lubrication system. However, magnetic bearings require a back-up bearing system for supporting the rotor shaft when the magnetic forces are less than required for the support of the shaft or when the magnetic bearings malfunction.

One prior type of back-up bearing utilized with magnetic bearings has a rolling element bearing that is mounted within the engine housing concentrically with the centerline of the shaft. During normal operation the magnetic bearing supports the shaft such that there is clearance between the back-up bearing and the shaft. Upon failure of the magnetic bearing or during periods of high shock loading the shaft is moved into contact with the back-up bearing.

One limitation associated with the above back-up bearing is that the shaft must transition through an air gap in order to be supported by the back-up bearing. In a high speed rotating device, when the magnetic support is removed the shaft is radially accelerated toward the inner race of the back-up bearing, where impact, bounce, and roll all occur. Further, the transition from the magnetic bearing to the back-up bearing is destabilized by the dynamics associated with the rotating shaft engaging the stationary back-up bearing. The destabilization is due to the "deadband" effect which encompasses the impact forces generated as the unsupported shaft contacts the inner bearing race of the bearing, and the rolling friction caused by the difference in surface speed between the shaft surface and the accelerating inner bearing race of the bearing element. The non-liniarity caused by this "deadband" effect is extremely destabilizing and can result in unstable chaotic behavior.

Although the prior techniques utilizing magnetic bearing systems with back-up bearings are steps in the right direction, the need for additional improvements still remains. The present invention satisfies this need in a novel and unobvious way.

SUMMARY OF THE INVENTION

One form of the present invention contemplates a gas turbine engine, comprising: a mechanical housing, a shaft rotatable within the housing and having a plurality of airfoils coupled thereto, an electromagnetic bearing for normally supporting the shaft, and a rolling element bearing coupled to and rotatable with the shaft for sharing the load on the shaft.

One object of the present invention is to provide an improved combination bearing for a gas turbine engine.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
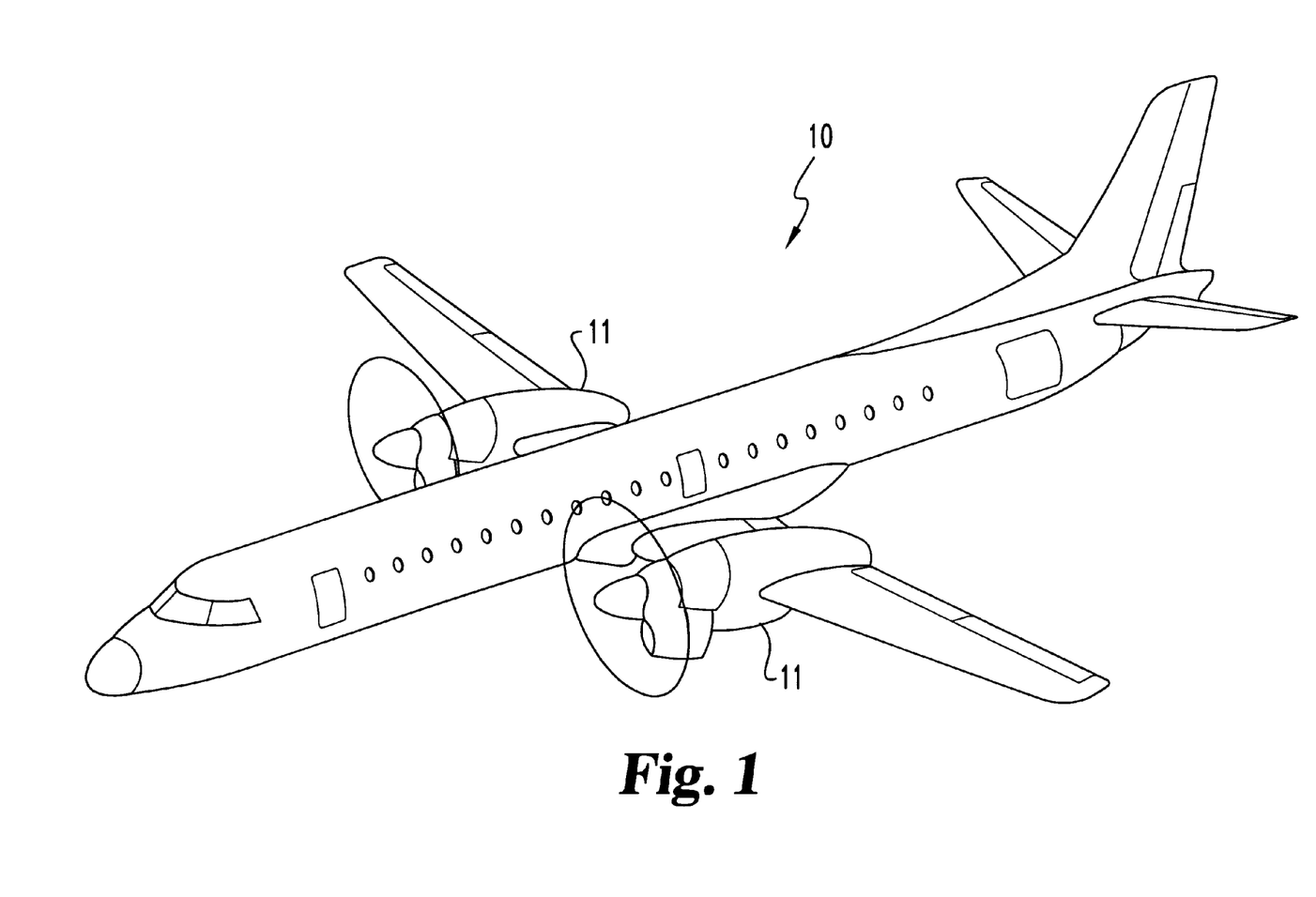
FIG. 1 is a perspective view of an aircraft having a gas turbine engine coupled thereto.
Figure 2:
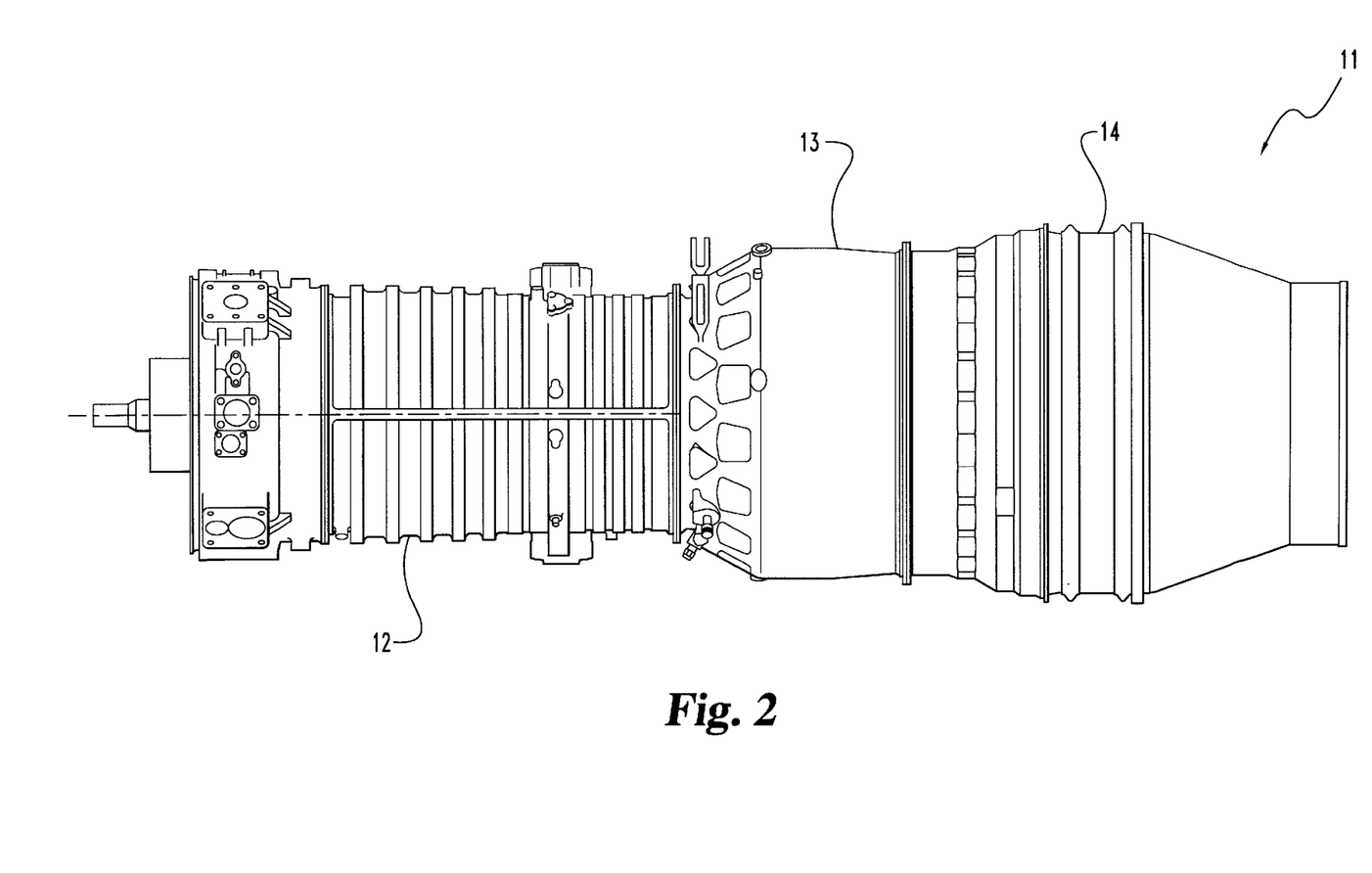
FIG. 2 is an enlarged side elevational view of the gas turbine engine of FIG. 1.

With reference to FIGS. 1 and 2, there is illustrated an aircraft 10 having an aircraft flight propulsion engine 11. It is understood that an aircraft is generic and includes helicopters, tactical fighters, trainers, missiles, and other related apparatuses. In the preferred embodiment the flight propulsion engine 11 defines a gas turbine engine integrating a compressor 12, a combustor 13, and a power turbine 14. It is important to realize that there are a multitude of ways in which the components can be linked together. Additional compressors and turbines could be added with intercoolers connecting between the compressors and reheat combustion chambers could be added between the turbines. Further, the gas turbine engine is equally suited to be used for industrial application. Historically, there has been widespread application of industrial gas turbine engines, such as pumping sets for gas and oil transmission lines, electricity generation, and naval propulsion.

Figure 3A:
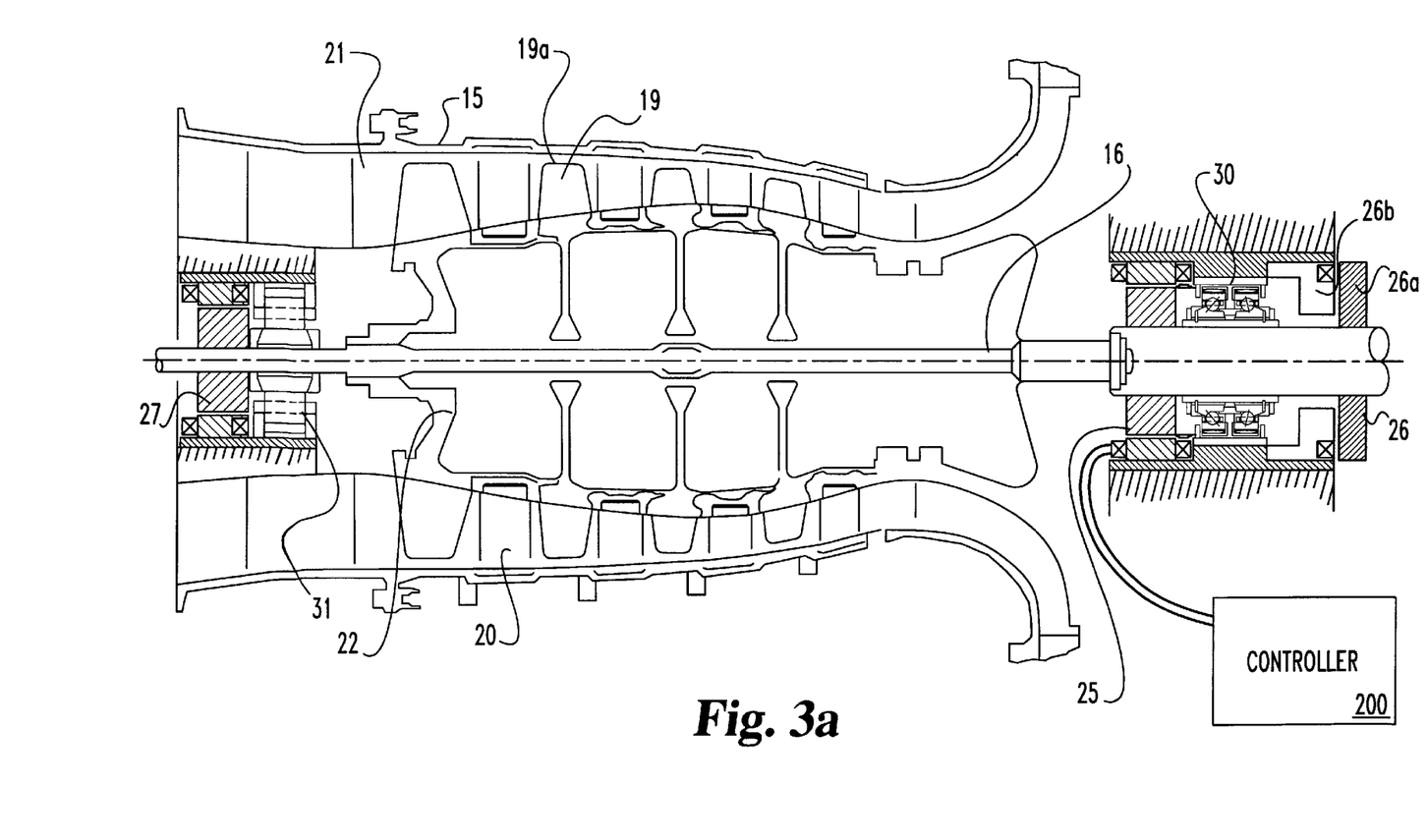
FIG. 3a is a meridional plain sectional view of the compressor comprising a portion of the FIG. 2 gas turbine engine according to one embodiment of the present invention.

With reference to FIG. 3*a*, there is illustrated the axial flow compressor 12 having a mechanical housing 15 and a plurality of blade rows that are fixedly mounted to a central shaft 16 for pressurizing a fluid. The rows of airfoils 19, having a tip 19*a* that is maintained radially spaced from the housing 15 in order to maintain clearance therebetween. The rotatable airfoils 19 being coupled to a rotor 22 and rotate relative to the compressor housing 15 when the shaft 16 is revolved by power imparted to central shaft 16 from the turbine 14. A plurality of corresponding stationary rows (stators) of airfoils 20 are coupled to the compressor housing 15. The flow of compressible fluid through a passageway 21 within the compressor housing 15 is influenced by the rotor and stator blade rows. In the preferred embodiment the compressible fluid is air. The blade rows being generally designed to behave as diffusers, with a corresponding increase in static pressure from the upstream region to the downstream region.

Figure 4:
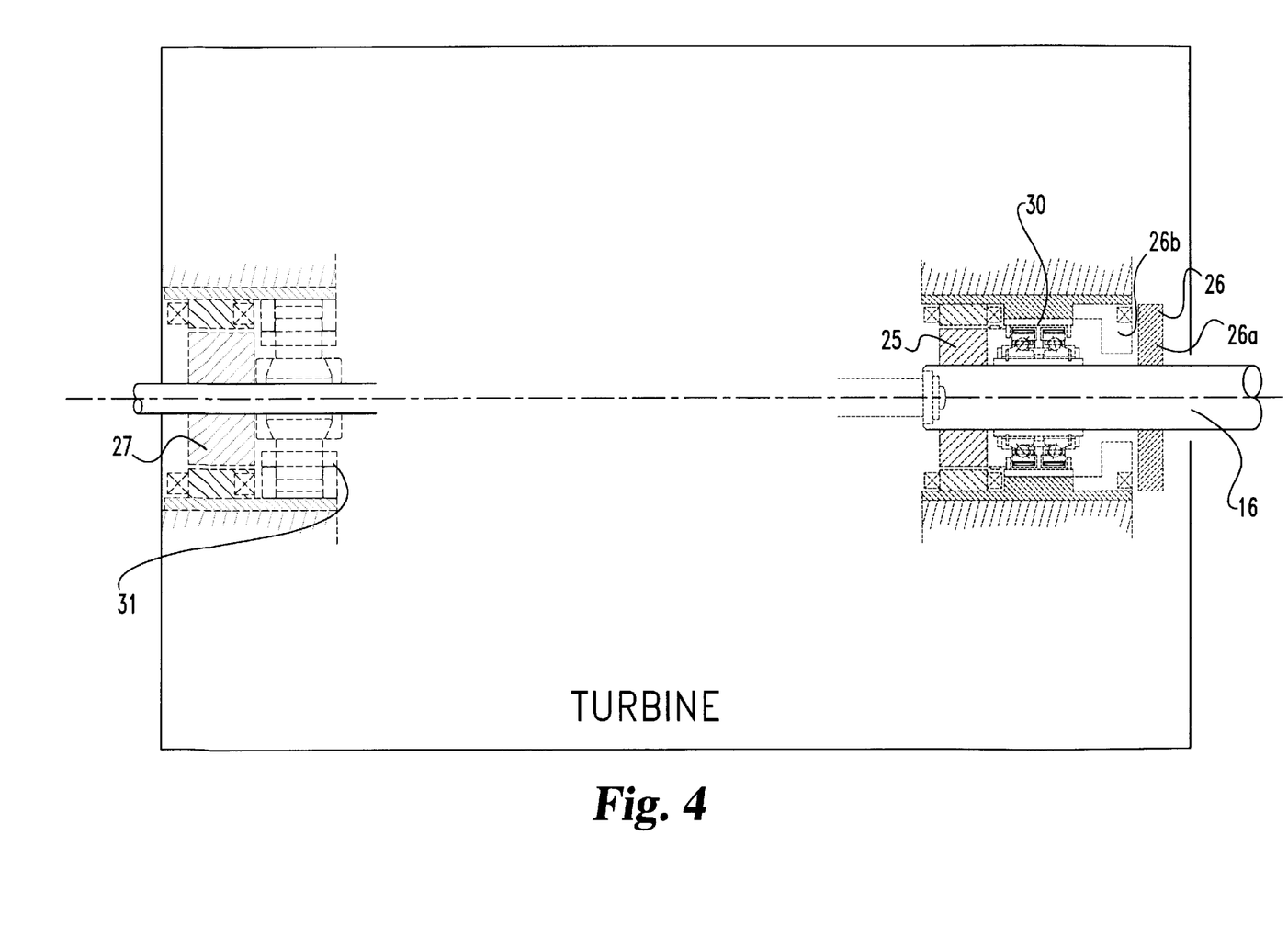
FIG. 4 is an illustrative view of a turbine comprising a portion of the FIG. 2 gas turbine engine according to another embodiment of the present invention.

The central shaft 16 being normally supported by an active electromagnetic bearing system. With reference to FIG. 4, there is an illustrative schematic of a turbine having a rotatable shaft supported by a magnetic bearing system and auxiliary bearing system substantially identical to that set forth for the compressor in FIG. 3*a*. It is understood that the bearing systems set forth herein are equally applicable to both turbines and compressors within the gas turbine engine. In the preferred embodiment the magnetic bearing system is a five axis system. The use of magnetic bearings instead of conventional oil lubrication bearings will allow the engine lubrication system to be removed, resulting in significant system weight reduction, reduced parasitic losses, simplification of the engine design and improved engine reliability through the elimination of bearing wear. Further, the use of magnetic bearings instead of conventional oil lubrication bearings will benefit the environment by eliminating the handling, storing, and disposing of synthetic oils.

A magnetic bearing system can serve as an integrated actuator for a high speed piece of turbomachinery. One of such applications being for a compressor wherein the actuator is utilized to provide compressor active stability control, compressor active tip clearance control, and for the active control of rotor dynamic instabilities by providing damping. Magnetic bearing systems are well suited for the application of these performance and operability enhancement active control techniques for gas turbine engines. An allowed and commonly owned U.S. patent application Ser. No. 08/396, 014, entitled MAGNETIC BEARINGS AS ACTUATION FOR ACTIVE COMPRESSOR STABILITY CONTROL is incorporated herein by reference.

In one form of the present invention the magnetic bearing system includes a first active magnetic radial bearing 25 positioned at one end of shaft 16 and a second magnetic radial bearing 27 positioned at the other end of the shaft 16. The magnetic bearings of the present invention are active electromagnetic bearings. An active magnetic thrust bearing 26 is-positioned so as to act on shaft 16 and counteract thrust loading. Active magnetic thrust bearing 26 includes a thrust disk 26*a* coupled to shaft 16 and a stator 26*b* coupled to the mechanical housing 15. The active magnetic bearings 25, 26, and 27 have the capability to adapt to the change in requirements for the rotor system, diagnose engine conditions, minimize blade tip clearance and further provide stability control. Each of the active magnetic radial bearings 25 and 27 include; stators 25*a*, 27*a*, and rotors 25*b* and 27*b*. The nominal clearance (air gap) between the magnetic radial bearing stators and rotors is in the range of about 0.010–0.012 inches. However, it is understood that the clearance between the magnetic radial bearing rotors and stators will change as the magnetic bearings fail or there is peaked loading. Further, the air gap changes will also occur during active closed loop control of the magnetic bearing system.

In one form of the present invention the maximum static load that each of the magnetic radial bearings 25 and 27 can support is about 500 pounds. Additionally, the maximum dynamic load that each of the magnetic radial bearings 25 and 27 can support is about 500 pounds. It is understood that other bearing support loads are contemplated herein which are dependent upon the space available for the bearings, bearing size, bearing material and other characteristics of the bearing. The magnetic bearings 25, 26, 27 are connected to a controller 200 that provides the functionality necessary to control the magnetic bearings.

It is well known that aircraft gas turbine engines are subject to a wide range of dynamic and static loading. Some of these loads, especially maneuvering and landing loads, can be quite severe and in the magnitude of up to about twenty times the earth's gravitational pull. The present invention contemplates a lightweight high temperature combination bearing for sharing the applied load acting on shaft 16. Auxiliary bearing units 30 and 31 run at the shaft speed of the respective component of the gas turbine engine and load share as needed with the magnetic bearing system.

Figure 5:
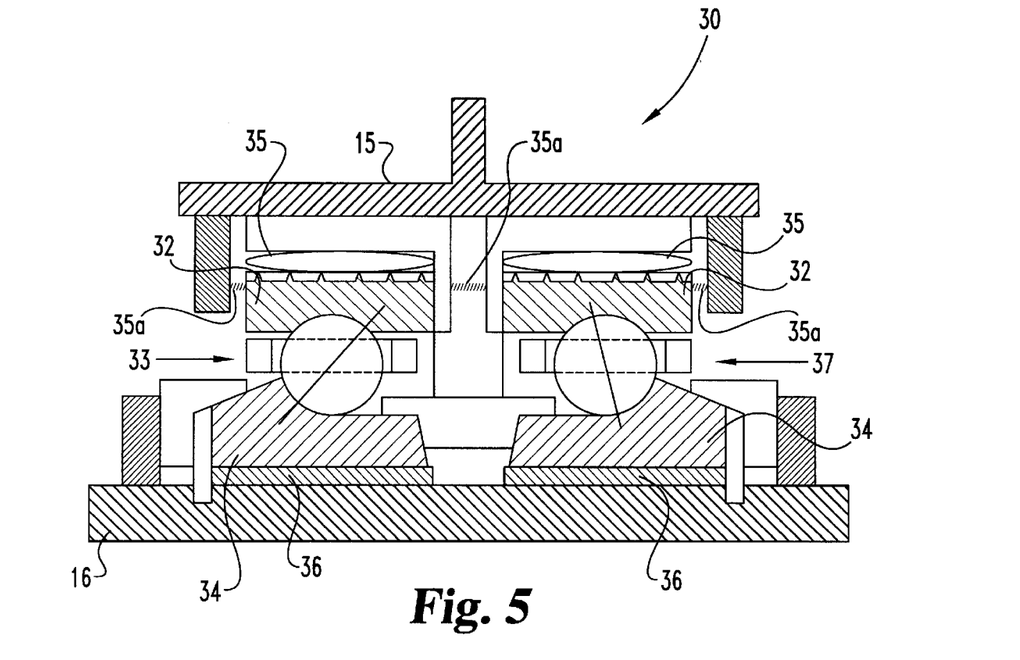
FIG. 5 is an enlarged side elevational view in section of the auxiliary thrust bearing comprising a portion of the FIG. 3a bearing system.

Referring to FIG. 5, there is illustrated an enlarged side elevational view in section of the auxiliary bearing unit 30. In the preferred embodiment the auxiliary bearing unit 30 is a dry solid lubricated rolling element type bearing. However, other lubrication schemes are contemplated herein. Bearing 33 comprising a portion of bearing unit 30 and has an outer bearing race 32 coupled to the housing 15, and in the preferred embodiment is a ball bearing. The inner bearing race 34 of bearing 33 being coupled to the rotatable shaft 16. A compliant interface 35 couples the outer bearing race 32 to the housing 15 and a second compliant interface 36 couples the inner bearing race 34 to shaft 16. Compliant interfaces 35 and 36 function to soft mount the bearing 33 of auxiliary bearing unit 30 between the rotatable shaft 16 and the housing 15. The light loading of bearing 33 outer races allows the inner bearing race 34 and rolling balls to continuously rotate with the rotor shaft 16.

Figure 7:
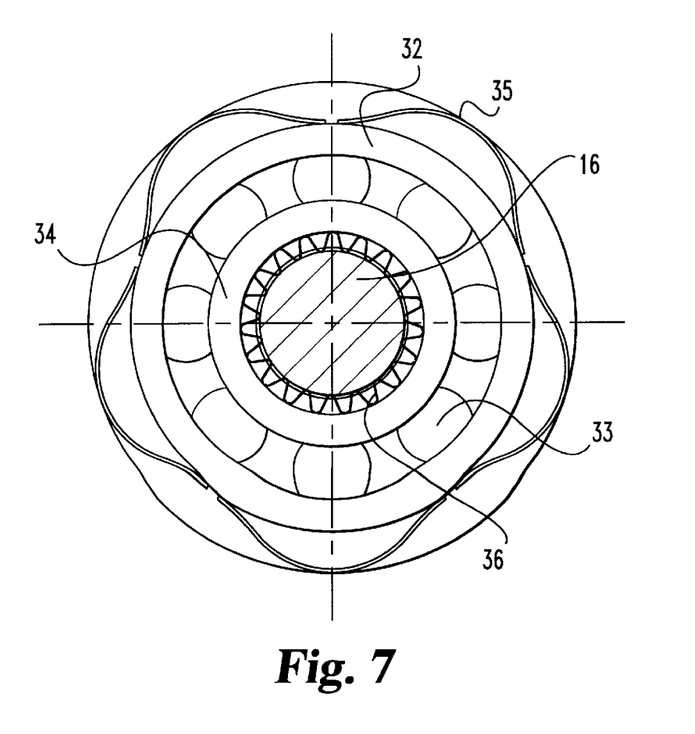
FIG. 7 is an illustrative end view showing the compliant interfaces positioning the auxiliary bearings between the rotor shaft and the engine housing.

The compliant interfaces 35 and 36 are elastic enough to permit the shaft 16 to seek its own dynamic center yet stiff enough to limit the radial and axial movement of the shaft. In the preferred embodiment the compliant interfaces 35*a* each provide a light preload on the shaft, and in a more preferred embodiment the preload is about 50 pounds. Compliant interfaces 35*a* in the preferred embodiment are springs having a spring rate of about 5000 lbs/in. It is understood that the bearing preload on the shaft can be adjusted as necessary for tuning the systems rotordynamics. With reference to FIG. 7, there is illustrated an end view of one embodiment of the bearing 33 being soft mounted between the rotatable shaft 16 and the mechanical housing 15. Compliant interfaces 35 and 36 in one embodiment are springs. More particularly, compliant interface 35 is a leaf spring, and compliant interface 36 is a continuous wave spring. In the preferred embodiment the spring rate for compliant interface 35 is about one hundred thousand lbs/in, and for compliant interface 36 is about fifty thousand lbs/in. It is understood that the compliant interfaces are not intended herein to be limited to springs, and that the appropriate spring rates are dependent upon the particular system parameters.

The soft mounting of the bearing 33 between the housing 15 and the shaft 16 enables a substantially stable transition from the all magnetic bearing support of rotor shaft 16 to a physically contacting mechanically assisted support of the shaft. The auxiliary bearing unit 30 sharing the load with the magnetic forces from the magnetic bearing to support the shaft 30. While the shaft 16 is normally supported by the magnetic force from the magnetic bearing and rotates about its centerline the auxiliary bearing units 30 and 31 provide a light load on the shaft and rotate at the shaft speed. Upon the failure of a magnetic bearing and/or the onset of a maneuver or other activity that generates a peak load the auxiliary bearing units 30 and 31 share the load on the shaft 16. Further, the auxiliary bearing units provide static support for the shaft 16 when the shaft is stationary. In the preferred embodiment of auxiliary bearing unit 30 upon the radial displacement of shaft 16 about five to seven thousandths of an inch the compliant interface 35 bottoms out and the outer bearing race 32 becomes hard coupled to housing 15. The compression of the compliant interface 35 allows the continued transfer of the bearing support from the magnetic bearing system to the auxiliary bearing units 30 and 31, and if necessary the auxiliary bearing units carry the complete shaft load to enable the flight mission to be completed. Soft coupling of the auxiliary units 30 and 31 to shaft 16 allows for the accommodation of the considerable differences in the thermal expansion coefficients between the shaft 16 and the inner bearing races.

In the preferred embodiment the auxiliary bearing unit 30 includes two angular contact ball bearings 33 and 37. The second ball bearing 37 being mounted substantially identical to the first ball bearing 33. It is understood that the two ball bearings 33 and 37 are substantially identical and like figure numbers will be utilized herein to represent like elements. The second ball bearing 37 being mounted at it's inner bearing race 34 through a compliant interface 36 to shaft 16 and having its outer bearing race 32 coupled to the housing 15 by a compliant interface 35. One of the ball bearings having a high contact angle to react the greater thrust load, and the other bearing having a low contact angle to react reverse thrust loads and corresponding radial loads. The auxiliary bearing unit 30 accommodates preloading and limits the axial and radial movement of the shaft 16 to prevent contact with the magnetic bearing system.

Figure 5A:
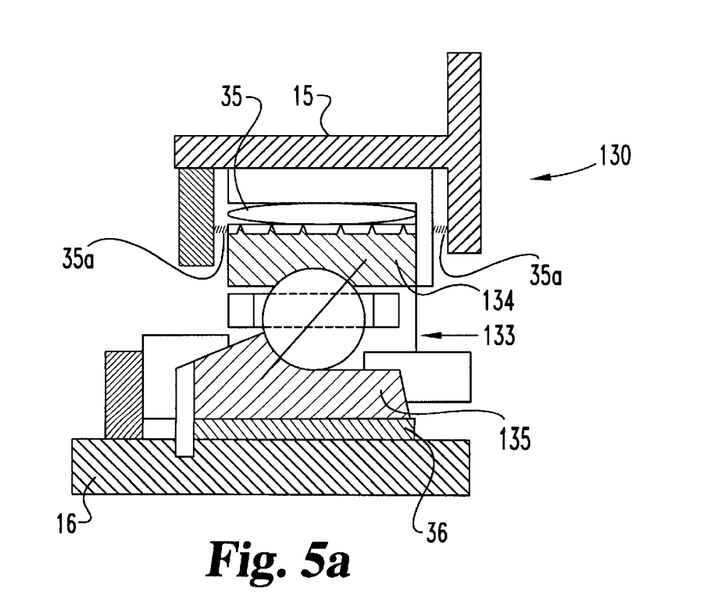
FIG. 5a is a side elevational view in section of an alternate embodiment of the auxiliary thrust bearing.

With reference to FIG. 5a, there is illustrated an alternative embodiment 130 of the auxiliary bearing unit. The auxiliary bearing unit 130 is designed and constructed for providing auxiliary thrust and radial bearing support for shaft 16. The auxiliary bearing unit 130 is substantially similar to auxiliary bearing unit 30, but only includes one ball type rolling bearing element. The bearing element 133 being a ball type element wherein the plurality of balls roll between an inner bearing race 135 and an outer bearing race 134. The auxiliary bearing unit 130 being soft mounted to shaft 16 and housing 15 in substantially the same manner as bearing unit 30.

In a preferred embodiment of the present invention the auxiliary bearing units 30 and 130 are designed to withstand temperatures of about 1,000° F. It is understood that the bearing utilized in the auxiliary bearings units are rolling element ball type bearings. In one form of the present invention the bearings are ceramic bearings (silicone nitride) having a ceramic inner-bearing race, a ceramic outer bearing race, and ceramic rolling ball elements. In another embodiment of the present invention the bearing units include hybrid bearings having a steel alloy inner and outer bearing race and a ceramic rolling element. The bearing units 30 and 130 and their related components are not externally lubricated and they have a dry solid lubrication.

Figure 6:
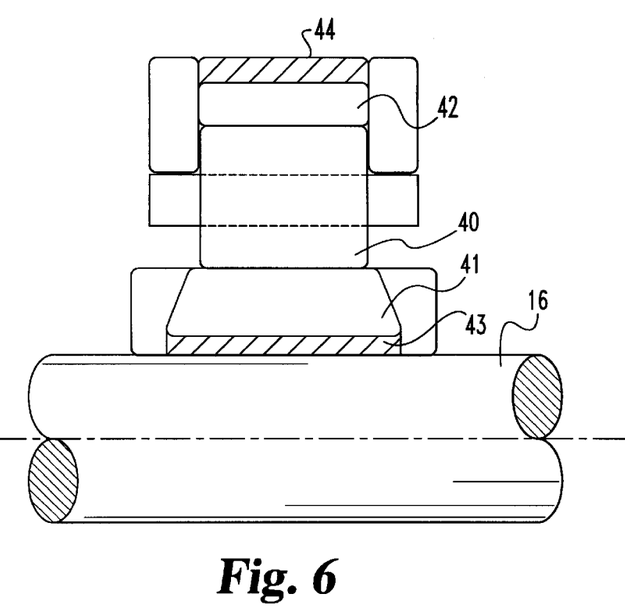
FIG. 6 is an enlarged side elevational view in section of the auxiliary radial bearing comprising a portion of the FIG. 3a bearing system.

Positioned at the other end of the shaft 16 for load sharing with radial magnetic bearing 27 is auxiliary bearing unit 31. In the preferred embodiment the auxiliary bearing unit 31 is a radial rolling element bearing. With reference to FIG. 6, there is illustrated an enlarged partial sectional view of the preferred embodiment of the radial roller bearing unit 31. The rolling element 40 comprising a cylindrical bearing element for supporting the radial load transmitted from shaft 16 that is not carried by the magnetic bearing system. In the preferred embodiment the cylindrical roller bearing 40 rolls between an inner bearing race 41 coupled to shaft 16 and an outer bearing race 42 coupled to housing 15. The auxiliary bearing unit 31 being mounted between shaft 16 and housing 15 by compliant interfaces 43 and 44. The compliant interfaces 43 and 44 are designed to soft mount the bearings between the shaft 16 and the housing 15 in a manner substantially identical to that for bearing units 30 and 130.

In a preferred embodiment of the present invention the auxiliary bearing units 31 is designed to withstand temperatures of about 1,000° F. It is understood that the bearing utilized in the auxiliary bearings units are rolling element roller type bearings. In one form of the present invention the bearings are ceramic bearings (silicone nitride) having a ceramic inner bearing race, a ceramic outer bearing race, and ceramic rolling roller elements. In another embodiment of the present invention the bearing units include hybrid bearings having a steel alloy inner and outer bearing race and a ceramic rolling element. The bearing unit 31 and their related components are not externally lubricated and they have a dry solid lubrication.

Figure 3B:
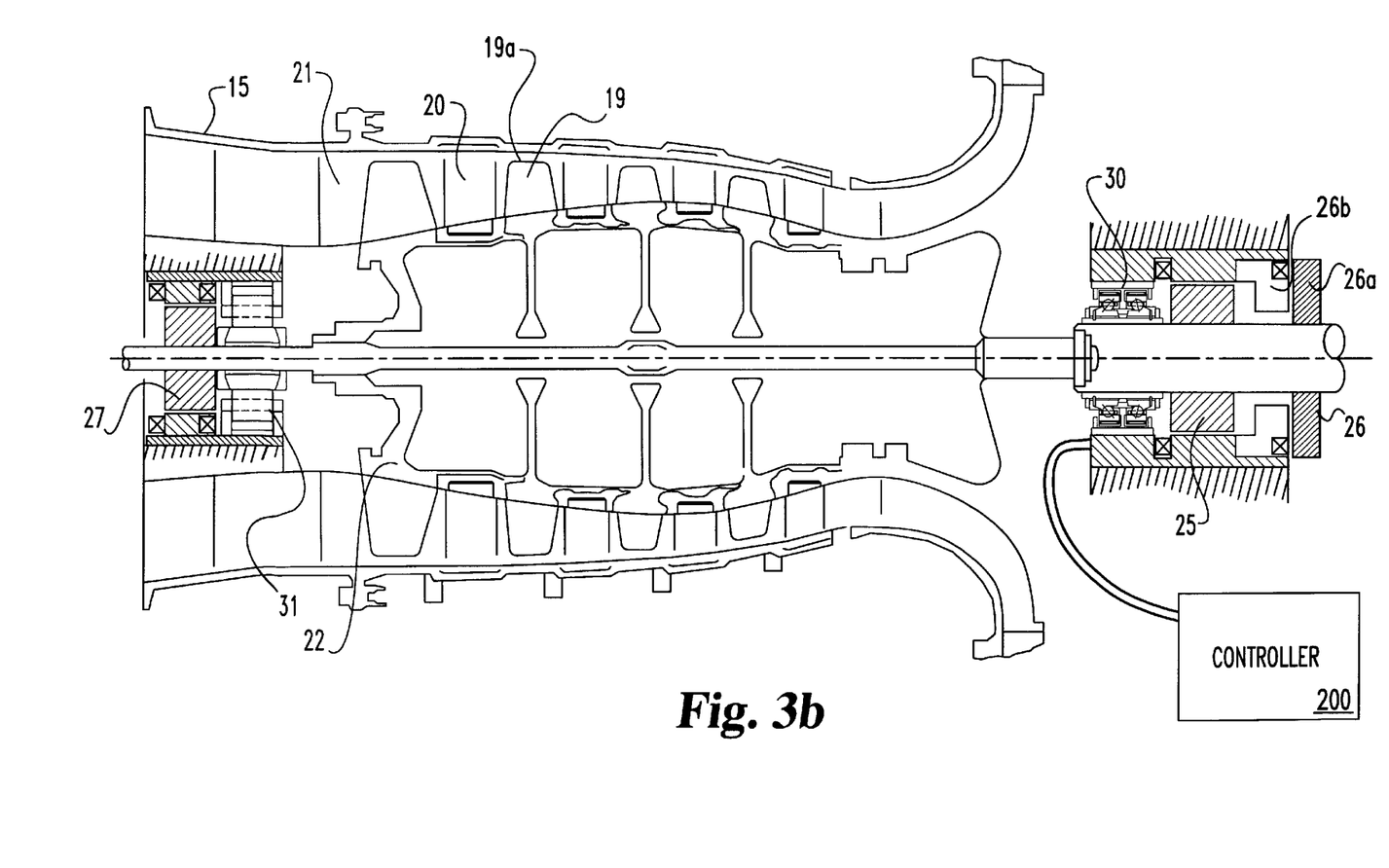
FIG. 3b is a meridional plain sectional view of the compressor comprising a portion of the FIG. 2 gas turbine engine according to another form of the present invention.

With reference to FIG. 3b, there is illustrated another embodiment of the combination bearing system. The combination bearing system is substantially identical to the FIG. 3a system, with one significant change relating to the relocation of the auxiliary bearing unit 30 from being tucked in the magnetic bearing 25 to being spaced therefrom. The auxiliary bearing unit 30 has been axially offset to optimize the gas turbine engine's rotordynamics. It is understood that the position of the combination bearing components will allow the tuning of the engine rotor critical speeds.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A combination, comprising:

a gas turbine engine having a mechanical housing;

a shaft rotatable within said housing and having a plurality of airfoils coupled thereto;

a magnetic bearing for supporting the shaft; and a rolling element bearing coupled to said shaft for sharing the load on said shaft said rolling element bearing having an inner race coupled to said shaft and an outer race coupled to said mechanical housing and a plurality of rolling elements normally contacting said inner race.

2. The combination of claim 1, wherein said rolling element bearing is running at the shaft speed, and wherein said magnetic bearing normally supporting said shaft in a first state, and said rolling element bearing acting to share the load in a second state.

3. The combination of claim 2, which further includes an aircraft and wherein said gas turbine engine is coupled to said aircraft, and wherein said second state is defined by a peak load associated with a maneuver of said aircraft.

4. The combination of claim 2, wherein said second state is defined by the failure of said magnetic bearing.

5. The combination of claim 1, wherein said magnetic bearing is an active electromagnetic radial bearing, and wherein said plurality of rolling elements normally contacting said outer race.

6. The combination of claim 5, wherein said electromagnetic radial bearing has a stator and a rotor, said rotor coupled to said shaft and said stator coupled to said housing with a nominal clearance between said stator and said rotor of about 0.010–0.012 inches.

7. The combination of claim 1, which further includes a first compliant interface coupling said outer bearing race to said housing and a said second compliant interface coupling said inner bearing race to said shaft.

8. The combination of claim 7, wherein said compliant interfaces are springs.

9. The combination of claim 7, wherein said complaint interfaces enable a substantially stable transition from the magnetic bearing support of said shaft to a mechanically assisted support of said shaft by said rolling element bearing.

10. The combination of claim 8, wherein said first compliant interface is a leaf spring and said second compliant interface is a continuous wave spring.

11. The combination of claim 8, wherein said compliant interfaces are elastic enough to permit said shaft to seek its own dynamic center and stiff enough to limit the axial and radial movement of said shaft.

12. The combination of claim 8, wherein said shaft upon being radially displaced a predetermined distance causes said first compliant interface to bottom out and hard couple said outer bearing race to said housing.

13. The combination of claim 12, wherein said predetermined distance is in the range of about 0.005–0.007 inches.

14. The combination of claim 2:

wherein said magnetic bearing is an active electromagnetic radial bearing having a stator coupled to said mechanical housing and a rotor coupled to said with a nominal clearance therebetween;

wherein said plurality of rolling elements normally contacting said outer race;

which further includes a first spring positioned between and coupling said outer bearing race to said housing and a said second spring positioned between and coupling said inner bearing race to said shaft, said springs are elastic enough to permit said shaft to seek its own dynamic center and stiff enough to limit the axial and radial movement of said shaft, and wherein said shaft upon being radially displaced a predetermined distance causes said first compliant interface to bottom out and hard couple said outer bearing race to said housing.

15. The combination of claim 14 wherein said first spring is a leaf spring with a spring rate of about one hundred thousand pounds per inch and said second spring is a continuous wave spring with a spring rate of about fifty thousand pounds per inch.

16. The combination of claim 14, wherein said bearing is a ceramic bearing.

17. The combination of claim 14, wherein said bearing is a hybrid bearing.

18. The combination of claim 1, wherein said bearing is capable of withstanding an operating environment of about one thousand degrees Fahrenheit.

19. A combination, comprising:

a gas turbine engine having a mechanical housing;

a shaft rotatable within said housing and having a plurality of airfoils coupled thereto;

an active radial magnetic bearing for normally supporting said shaft in a first condition; and an auxiliary bearing unit coupled to said shaft for sharing the load on said shaft in a second condition, said auxiliary bearing unit comprises:

an auxiliary bearing having a first inner race and a first outer race and a plurality of first rolling elements normally contacting said first races;

a first compliant interface coupling said first outer race to said housing;

a second compliant interface coupling said first inner race to said shaft;

a second rolling element bearing having a second inner race and a second outer race and a plurality of second rolling elements normally contacting said second races;

a third compliant interface coupling said second outer race to said housing; and a fourth compliant interface coupling said second inner race to said shaft.

20. The combination of claim 19, wherein said rolling element bearings are ball bearings, one of said ball bearings has a high contact angle to react the greater thrust load and the other of said bearings has a low contact angle to react reverse thrust loads and corresponding radial loads.

21. The combination of claim 20:

wherein said compliant interfaces are springs;

wherein said shaft upon being radially displaced a predetermined distance causes said first and third compliant interfaces to bottom out and hard couple said outer bearing races to said housing.

22. A combination, comprising:

a gas turbine engine including a mechanical housing;

a shaft rotatable within said housing and having a plurality of airfoils coupled thereto;

a pair of spaced active electromagnetic radial bearings for normally supporting said shaft;

a first auxiliary rolling element bearing unit coupled between said housing and said shaft for sharing the load on said shaft, said first auxiliary rolling element bearing unit disposed proximate one of said pair of spaced active electromagnetic radial bearings, said first auxiliary rolling element bearing unit having at least one first rolling element bearing with a first inner race coupled to said shaft and a first outer race coupled to said mechanical housing and at least one first rolling element normally contacting said first races; and a second auxiliary rolling element bearing unit coupled between said housing and said shaft for sharing the load on said shaft, said second auxiliary rolling element bearing unit disposed proximate the other of said pair of spaced active electromagnetic radial bearings, said second auxiliary rolling element bearing unit having at least one second rolling element bearing with a second inner race coupled to said shaft and a second outer race coupled to said mechanical housing and at least one second rolling element normally contacting said second races.

23. The combination of claim 22, wherein said at least one first rolling element bearing and said at least one second rolling element bearing running at the shaft speed, and wherein said pair of radial magnetic bearing providing substantially all of the support for said shaft in a first mode and said auxiliary rolling element bearing units providing support in a second mode.

24. The combination of claim 22:

which further includes a first compliant interface between said first inner race and said shaft;

which further includes a second compliant interface between first outer race and said housing;

which further includes a third compliant interface between said second inner race and said shaft;

which further includes a fourth compliant interface between said second outer race and said housing; and wherein said compliant interface soft mount said auxiliary rolling element bearing units between said shaft and said housing, wherein said soft mounting enables a substantially stable transition from an all magnetic bearing support of said shaft to a mechanically assisted support of said shaft by said rolling element bearings.

25. The combination of claim 24, wherein said compliant interfaces are elastic enough to permit said shaft to seek its own dynamic center yet stiff enough to limit the axial and radial movement of said shaft.

26. The combination of claim 25, wherein said shaft upon being radially displaced a distance causes said second and fourth compliant interfaces to bottom out so as to hard couple said outer bearing races to said housing.

27. The combination of claim 26, wherein the distance necessary to cause said second and fourth compliant interfaces to bottom out is about 0.005–0.007 inches.

28. The combination of claim 24, wherein at least one of said rolling element bearing is a cylindrical roller bearing.

29. The combination of claim 24, wherein said auxiliary rolling element bearing units are capable of withstanding operating temperatures of about one thousand degrees Fahrenheit.

* * * * *

UNITED STATES PATENT AND TRADEMARK OFFICE
CERTIFICATE OF CORRECTION

PATENT NO. : 5,977,677
DATED : November 2, 1999
INVENTOR(S) : Mark S. Henry et al.

It is certified that error appears in the above-identified patent and that said Letters Patent is hereby corrected as shown below:

On the title page item [56], insert the following article information

"Pratt Engine Meets Phase 1
IHPTET Goals, Aviation Week and Space Technology, November 14, 1994, page 38-39."
In column 7, lines 30 and 32, please delete "bearing".
In column 7, line 49, please delete "bearing".
In column 7, line 55, after "said", please insert --shaft--.
In column 7, line 58, please insert --and-- after "race;".
In column 7, lines 60 and 62, please delete "bearing".
In column 8, line 1, please change "compliant interface" to --spring--.
In column 8, line 2, please delete "bearing".
In column 8, line 46, please insert --and-- after "springs;"
In column 8, line 50, please delete "bearing".
In column 9, line 15, please delete "magnetic" and please insert --electromagnetic-- before radial.
In column 10, line 14, please delete "bearing".

Signed and Sealed this

Seventh Day of November, 2000

Q. TODD DICKINSON

*Attest:*

*Attesting Officer*            *Director of Patents and Trademarks*